Patented Mar. 14, 1933

1,901,316

UNITED STATES PATENT OFFICE

HANS MEERWEIN, OF MARBURG-ON-THE-LAHN, GERMANY, ASSIGNOR TO WINTHROP CHEMICAL COMPANY, INC., OF NEW YORK, N. Y., A CORPORATION OF NEW YORK

PROCESS OF PREPARING TRIBROMOETHYL ALCOHOL

No Drawing. Application filed February 16, 1932, Serial No. 593,420, and in Germany February 25, 1931.

The present invention relates to a process of preparing tribromoethylalcohol.

It is known that trichloroacetaldehyde may be reduced to trichloroethylalcohol by the action of alkylmagnesiumhalogenides. However, it is not possible to transform tribromoacetaldehyde into tribromoethylalcohol in the same manner since the tribromoacetaldehyde displays another behaviour to the reduction agent than the trichloroacetaldehyde.

In accordance with the present invention tribromoethylalcohol may be obtained by reacting upon tribromoacetaldehyde with an alkyl-aluminium compound. The process probably proceeds when, for example, reacting upon tribromoacetaldehyde with triethyl-aluminium while splitting off ethylene according to the following equation:

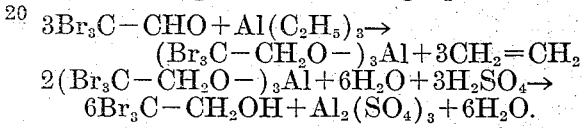

As alkylaluminium compounds I use preferably the trialkylaluminium compounds, for instance, triethyl-, tripropyl- or triisoamyl-aluminium which may be introduced into the reaction mixture in form of their etherates. Instead of the trialkylaluminium compounds the reaction may also be performed by employing alkyl compounds of aluminium mono- or di-halogenides, such as ethylaluminium dibromide or diethylaluminium monobromide, propylaluminium-iodides and the like.

The reaction is performed advantageously at room temperature and in the presence of an organic solvent being inert to the starting materials, preferably ether, but also other organic solvents, such as diethylenedioxide, may be employed. The solution of tribromoacetaldehyde is advantageously gradually introduced into the solution of the aluminiumalkyl compound whereupon the mixture is suitably heated for a short time on the water-bath. Then the mixture is treated with water or a dilute aqueous mineral acid solution, preferably dilute sulfuric acid, and the tribromoethylalcohol formed is separated from its solution in the organic solvent in the customary manner.

The invention is further illustrated by the following example without being restricted thereto:

Example

A solution of 30 parts by weight of tribromoacetaldehyde in 60 parts by weight of ether is gradually added to a solution of 10 p. b. w. of aluminium triethyl-etherate (Berichte der deutschen Chem. Ges. 56, page 466 et seq.) in ether. Ethylene is evolved. After the addition the mixture is heated for a short time and then dilute aqueous sulfuric acid is added. From the solution in ether after drying the tribromoethylalcohol is obtained in a good yield by evaporating the ether and fractionating the residue in vacuo. The tribromoethylalcohol distils at 96 to 100° C. under a pressure of 13 mm.

The tribromoethylalcohol is also obtainable when, for example, 22.7 grams of diethylaluminium-iodide are caused to react with 30 grams of tribromoacetaldehyde, or 33 grams of ethylaluminium-di-iodide are caused to react with 30 grams of tribromoacetaldehyde in the above indicated manner. In these cases the resulting ethereal solution of the tribromoethylalcohol is washed with an aqueous sodium thiosulfate solution in order to remove iodine dissolved therein. The reaction may also be performed in a solution of other organic solvents being inert to the starting material, for example, diethylene-dioxide and the like. As aluminium alkyl compounds further may be employed, for example, triethylaluminium itself, tripropylaluminium, triisoamylaluminium or their etherates.

While I have described my improvements in great detail and with respect to preferred embodiments thereof, I do not desire to limit myself to such details or embodiments, since many modifications and changes may be made and the invention embodied in widely different forms without departing from the spirit or scope of the invention in its broadest aspects. Hence I desire to cover all modifications and forms within the scope or language of any one or more of the appended claims.

I claim:—

1. In the process of preparing tribromoethylalcohol, the step which comprises treating tribromoacetaldehyde with an aluminium alkyl compound in the presence of an organic solvent being inert to the starting materials.

2. In the process of preparing tribromoethylalcohol, the step which comprises treating tribromoacetaldehyde with an aluminium trialkyl compound in the presence of an organic solvent being inert to the starting materials.

3. In the process of preparing tribromoethylalcohol, the step which comprises treating tribromoacetaldehyde with an aluminium trialkyl compound in ethereal solution.

4. In the process of preparing tribromoethylalcohol, the step which comprises treating tribromoacetaldehyde with aluminium triethyletherate in ethereal solution.

5. In the process of preparing tribromoethylalcohol, the step which comprises treating tribromoacetaldehyde with an alkyl-aluminium-halogenide in the presence of an organic solvent being inert to the starting materials.

6. In the process of preparing tribromoethylalcohol, the step which comprises treating tribromoactaldehyde with an alkyl-aluminium-halogenide in ethereal solution.

7. In the process of preparing tribromoethylalcohol, the step which comprises treating tribromoacetaldehyde with an alkyl-aluminium-iodide in ethereal solution.

8. In the process of preparing tribromoethylalcohol, the step which comprises treating tribromoacetaldehyde with diethylaluminium-iodide in ethereal solution.

9. The process which comprises reacting upon tribromoacetaldehyde with an aluminium alkyl compound in the presence of a solvent being inert to the starting materials, then treating the reaction mixture with a dilute aqueous mineral acid solution and separating the tribromoethylalcohol formed from the organic solution in the customary manner.

10. The process which comprises reacting upon tribromoacetaldehyde with a trialkyl-aluminium compound in the presence of a solvent being inert to the starting materials, then treating the reaction mixture with a dilute aqueous mineral acid solution and separating the tribromoethylalcohol formed from the organic solution in the customary manner.

11. The process which comprises reacting upon tribromoacetaldehyde with a trialkyl-aluminium compound in ethereal solution, then treating the reaction mixture with a dilute aqueous sulfuric acid solution and separating the tribromoethylalcohol formed from the ethereal solution by distillation.

12. The process which comprises reacting upon tribromoacetaldehyde with a triethylaluminium compound in ethereal solution, then treating the reaction mixture with a dilute aqueous sulfuric acid solution and separating the tribromoethylalcohol formed from the ethereal solution by distillation.

13. The process which comprises reacting upon about 30 parts by weight of tribromoacetaldehyde with about 10 parts by weight of aluminiumtriethyl-etherate in ethereal solution, then treating the reaction mixture with a dilute aqueous sulfuric acid solution and separating the tribromoethylalcohol formed from the ethereal solution by distillation.

14. The process which comprises reacting upon tribromoacetaldehyde with an alkylaluminium-halogenide in the presence of a solvent being inert to the starting materials, then treating the reaction mixture with a dilute aqueous mineral acid solution and separating the tribromoethylalcohol formed from the organic solution in the customary manner.

15. The process which comprises reacting upon tribromoacetaldehyde with an alkylaluminium halogenide in ethereal solution, then treating the reaction mixture with a dilute aqueous sulfuric acid solution and separating the tribromoethylalcohol formed from the ethereal solution by distillation.

16. The process which comprises reacting upon tribromoacetaldehyde with an alkylaluminium iodide in ethereal solution, then treating the reaction mixture with a dilute aqueous sulfuric acid solution and separating the tribromoethylalcohol formed from the ethereal solution by distillation.

17. The process which comprises reacting upon tribromoacetaldehyde with dialkylaluminium-iodide in the presence of a solvent being inert to the starting materials, then treating the reaction mixture with a dilute aqueous sulfuric acid solution and separating the tribromoethylalcohol formed from the organic solution by distillation.

In testimony whereof, I affix my signature.

HANS MEERWEIN.